United States Patent
Matsuoka

(10) Patent No.: US 11,663,710 B2
(45) Date of Patent: May 30, 2023

(54) IMAGE PROCESSING DEVICE, IMAGING DEVICE, IMAGE PROCESSING METHOD, AND RECORDING MEDIUM

(71) Applicant: CANON KABUSHIKI KAISHA, Tokyo (JP)

(72) Inventor: Masaaki Matsuoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 17/017,026

(22) Filed: Sep. 10, 2020

(65) Prior Publication Data

US 2020/0410279 A1 Dec. 31, 2020

Related U.S. Application Data

(63) Continuation of application No. PCT/JP2019/009312, filed on Mar. 8, 2019.

(30) Foreign Application Priority Data

Mar. 22, 2018 (JP) .............................. JP2018-054173

(51) Int. Cl.
| | |
|---|---|
| *G06V 10/56* | (2022.01) |
| *G06T 7/194* | (2017.01) |
| *G06T 7/00* | (2017.01) |
| *G06T 7/529* | (2017.01) |
| *H04N 5/232* | (2006.01) |
| *H04N 5/222* | (2006.01) |

(52) U.S. Cl.
CPC .............. *G06V 10/56* (2022.01); *G06T 7/194* (2017.01); *G06T 7/529* (2017.01); *G06T 7/97* (2017.01);
(Continued)

(58) Field of Classification Search
CPC ........ G06V 10/56; G06V 10/54; G06T 7/194; G06T 7/529; G06T 7/97;
(Continued)

(56) References Cited

U.S. PATENT DOCUMENTS

| | | | |
|---|---|---|---|
| 2009/0240153 A1* | 9/2009 | Kim | .................. G01S 7/5205 |
| | | | 600/453 |
| 2010/0238160 A1 | 9/2010 | Yea et al. | |

(Continued)

FOREIGN PATENT DOCUMENTS

| | | | |
|---|---|---|---|
| JP | 2006246200 A | * | 9/2006 |
| JP | 2008-135812 A | | 6/2008 |

(Continued)

OTHER PUBLICATIONS

International Search Report issued in International Application No. PCT/JP2019/009312 dated May 7, 2019, pp. 1-2.

*Primary Examiner* — John B Strege
*Assistant Examiner* — Daniel C Chang
(74) *Attorney, Agent, or Firm* — Carter, DeLuca & Farrell LLP

(57) ABSTRACT

The image processing device includes an imaging unit that images a subject and a distance map acquisition unit that acquires information regarding a distance distribution of the subject as map data. The distance map acquisition unit acquires map data with an image deviation amount or a defocused amount related to a captured image or distance map data in conformity with a TOF scheme or an imaging plane phase difference detection scheme of using a pupil division type image sensor. An image processing unit generates data of a texture image in which a low-frequency component of a captured image is inhibited and combines the data of the texture image and the map data acquired by the distance map acquisition unit to generate image data in which a distance distribution of a subject is expressed.

17 Claims, 9 Drawing Sheets

(52) U.S. Cl.
CPC ..... *H04N 5/2226* (2013.01); *H04N 5/232122* (2018.08)

(58) Field of Classification Search
CPC . G06T 2207/10024; G06T 2207/10028; G06T 2207/20212; G06T 5/50; H04N 5/2226; H04N 5/232122; H04N 5/23293; H04N 9/646; H04N 9/74; G02B 7/34; G03B 13/36; G03B 17/18
See application file for complete search history.

(56) References Cited

U.S. PATENT DOCUMENTS

| | | | |
|---|---|---|---|
| 2016/0227121 A1 | 8/2016 | Matsushita | |
| 2017/0230568 A1* | 8/2017 | Yamaguchi | H04N 5/232123 |
| 2017/0244867 A1* | 8/2017 | Yasutomi | H04N 1/6027 |
| 2018/0084203 A1* | 3/2018 | Honjo | G06T 5/50 |
| 2018/0205926 A1* | 7/2018 | Mogalapalli | H04N 13/122 |
| 2019/0130591 A1* | 5/2019 | Tanaka | G06T 7/55 |
| 2019/0253689 A1* | 8/2019 | Yanai | G06T 5/002 |
| 2019/0253690 A1* | 8/2019 | Yanai | G06T 5/002 |

FOREIGN PATENT DOCUMENTS

| | | |
|---|---|---|
| JP | 2010-218548 A | 9/2010 |
| JP | 2014-207591 A | 10/2014 |
| JP | 2015-041901 A | 3/2015 |
| JP | 2016-143919 A | 8/2016 |
| JP | 2017-032360 A | 2/2017 |
| JP | 2017032360 A * | 2/2017 |

* cited by examiner

IMAGE PROCESSING DEVICE, IMAGING DEVICE, IMAGE PROCESSING METHOD, AND RECORDING MEDIUM

CROSS-REFERENCE TO RELATED APPLICATIONS

This application is a Continuation of International Patent Application No. PCT/JP2019/009312, filed Mar. 8, 2019, which claims the benefit of Japanese Patent Application No. 2018-054173, filed Mar. 22, 2018, both of which are hereby incorporated by reference herein in their entirety.

BACKGROUND OF THE INVENTION

Field of the Invention

The present invention relates to a technology for processing image data of a subject and distance distribution information of the subject.

Background Art

A distance map is information indicating a distance distribution of a subject. There is a technology in which a user can intuitively ascertain the sense of distance to a subject by processing and displaying an image using distance map data. Patent Literature 1 discloses a method called so-called peaking used to emphasize and display an image region of a subject in a focused state. In the peaking disclosed in Patent Literature 1, a process is performed to convert an imaging signal into a monochromatic signal and then color an image region of a subject in a focused state with a color in accordance with a distance to the subject.

CITATION LIST

Patent Literature

Patent Literature 1: Japanese Patent Laid-Open No. 2008-135812

In the technology of the related art disclosed in Patent Literature 1, however, it is difficult to ascertain an original subject color at a time point at which an imaging signal is converted into a monochromatic signal.

SUMMARY OF THE INVENTION

The present invention can provide an image processing device capable of ascertaining a sense of distance to a subject without influencing on colors in which the subject is displayed.

According to an embodiment of the present invention, an image processing device includes: at least one processor and memory holding a program which makes the processor function as: a first acquirer configured to acquire image data of a subject; a second acquirer configured to acquire information regarding a distance distribution of the subject as map data; a first generator configured to generate data of a texture image in which a low-frequency component of the image data is inhibited; and a second generator configured to generate first data indicating luminance and a distance distribution of the subject from the map data and the data of the texture image.

Further features of the present invention will become apparent from the following description of exemplary embodiments with reference to the attached drawings.

DESCRIPTION OF THE EMBODIMENTS

Hereinafter preferred embodiments of the present invention will be described in detail with reference to the drawings. An application example of a digital camera which is an example of an image processing device according to the present invention will be described.

First Embodiment

As in a peaking process disclosed in Japanese Patent Laid-Open No. 2008-135812 described above, when a color imaging signal is used in a display image as it is, a peaking color and a subject color are fade in some cases depending on a subject. Therefore, it is difficult to ascertain a sense of distance to the subject.

Accordingly, the embodiment provides an image processing device capable of displaying an image in which a sense of distance to a subject (a positional relation in a depth direction) can be ascertained in a state in which colors in which the subject is displayed are maintained.

Figure 1:
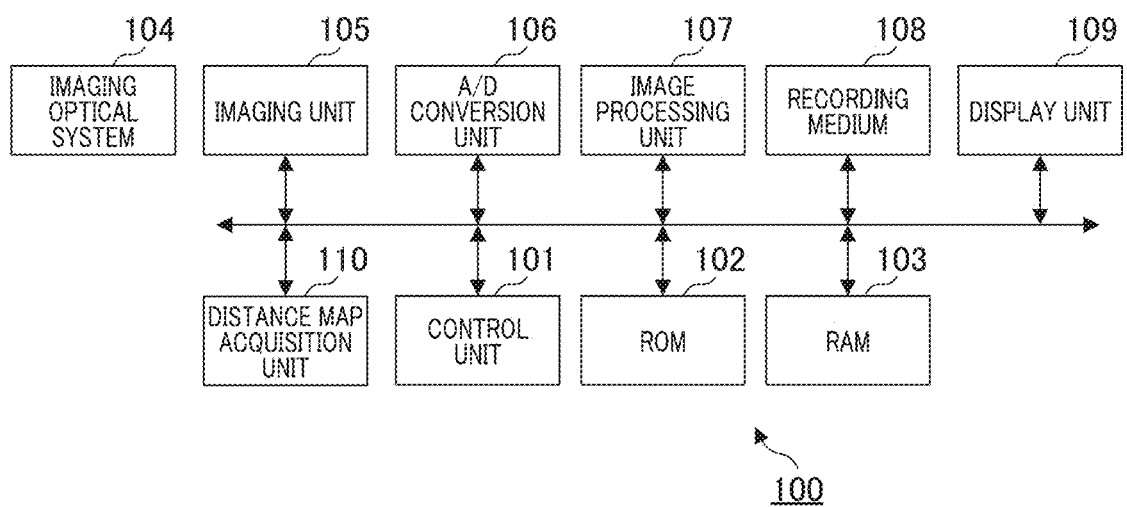
FIG. 1 is a block diagram illustrating a functional configuration of an imaging device according to an embodiment of the present invention.

FIG. 1 is a block diagram illustrating a functional configuration of an imaging device 100 according to the embodiment. A control unit 101 includes a central processing unit (CPU) and controls the entire imaging device. The control unit 101 reads an operation program of each constituent included in the imaging device 100 from a read-only memory (ROM) 102 and loads the program on a random access memory (RAM) 103 to execute the program. The ROM 102 is a rewritable nonvolatile memory and stores parameters or the like necessary for an operation of each constituent included in the imaging device 100 in addition to an operation program executed by the CPU. The RAM 103 is a rewritable volatile memory and is used as a temporary storage area of data output in an operation of each constituent included in the imaging device 100.

An imaging optical system 104 includes a lens or a diaphragm and forms light from a subject as an image on an imaging unit 105. The imaging unit 105 includes an image sensor such as a charge coupled device (CCD) image sensor or a complementary metal-oxide-semiconductor (CMOS) image sensor. The image sensor performs photoelectric conversion on an optical image formed by the imaging optical system 104 and outputs an analog image signal to an analog/digital (A/D) conversion unit 106. The A/D conversion unit 106 performs an A/D conversion process on an input analog image signal and outputs digital image data to the RAM 103 to store the digital image data.

The image processing unit 107 applies various kinds of image processing such as white balance adjustment, color interpolation, scaling, and filtering on image data stored in the RAM 103. The recording medium 108 is a memory card or the like which can be detachably mounted on the imaging device 100 and records image data stored in the RAM 103. The image data processed by the image processing unit 107, image data after A/D conversion by the A/D conversion unit 106, and the like are recorded as recording image data on the recording medium 108. The display unit 109 includes a display device such as a liquid crystal display (LCD), performs through display of a captured image acquired by the imaging unit 105, and display various kinds of information on a screen.

A distance map acquisition unit 110 acquires information regarding a distance distribution of a subject as a distance map in conformity with a time of flight (TOF) scheme. Data with an image deviation amount of a defocused amount related to a distance map or a captured image has depth information in a depth direction of the subject. Hereinafter, data indicating a distribution of the depth information is referred to as distance map data. The acquired distance map data is stored as digital data in the RAM 103. Any method of generating the distance map data can be used.

Figure 2:
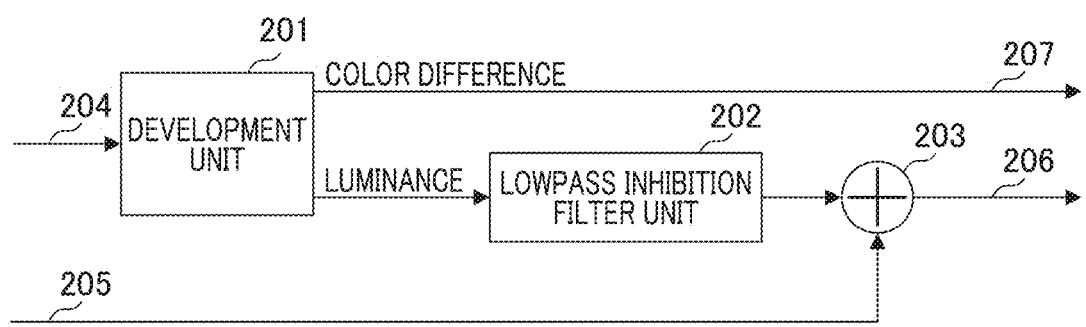
FIG. 2 is a block diagram illustrating a functional configuration of an image processing unit according to the embodiment of the present invention.

FIG. 2 is a block diagram illustrating a functional configuration of the image processing unit 107 according to the embodiment. A development unit 201 acquires image data 204 converted by the A/D conversion unit 106 and converts the image data into a luminance signal and a color difference signal by performing processes such as white balance adjustment and color interpolation. The development unit 201 performs a YC separation process of separating a luminance component (Y) and a color component (C) of the image data 204 of the subject and outputs the luminance signal and the color difference signal.

A lowpass inhibition filter unit 202 acquires the luminance signal from the development unit 201 and performs a filtering process to be described below to generate a signal of a texture image in which a low-frequency component is inhibited. The lowpass inhibition filter unit 202 outputs a signal of the texture image in which the low-frequency component is inhibited to an addition unit 203. The addition unit 203 adds an output signal of the lowpass inhibition filter unit 202 to an output signal 205 of the distance map acquisition unit 110 and outputs an addition result as a luminance signal 206. The display unit 109 in FIG. 1 displays a live-view image on a screen in real time in accordance with the luminance signal 206 and a color difference output signal 207 output from the development unit 201.

Figure 3:
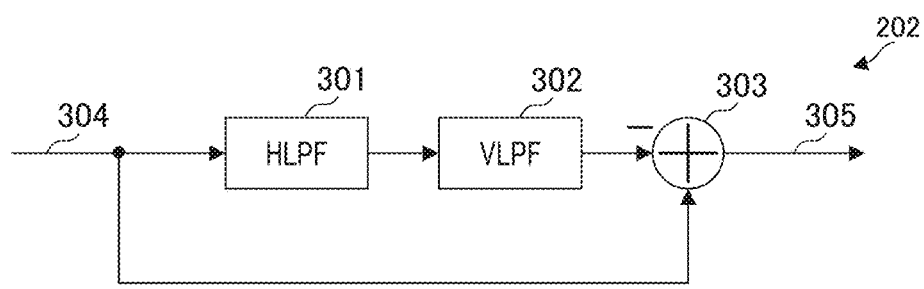
FIG. 3 is a block diagram illustrating a functional configuration of a lowpass inhibition filter unit according to the embodiment of the present invention.

FIG. 3 is a block diagram illustrating a functional configuration example of the lowpass inhibition filter unit 202. A luminance signal 304 from the development unit 201 is input and a horizontal lowpass filter unit (referred to as an HLPF) 301 performs lowpass filtering in the horizontal direction of the screen. A vertical lowpass filter unit (referred to as a VLPF) 302 acquires an output signal of the HLPF 301 and performs lowpass filtering in the vertical direction of the screen. A subtraction unit 303 acquires the luminance signal 304 and an output signal of the VLPF 302 and subtracts the output signal of the VLPF 302 from the luminance signal 304. The signal after the subtraction is an output signal 305 of the lowpass inhibition filter unit 202.

In the embodiment, filter coefficients of the HLPF 301 and the VLPF 302 are set to [121]. A method of inhibiting the low-frequency component is not limited to a method of using a lowpass filter. For example, a bandpass filter may be used.

Figure 4:
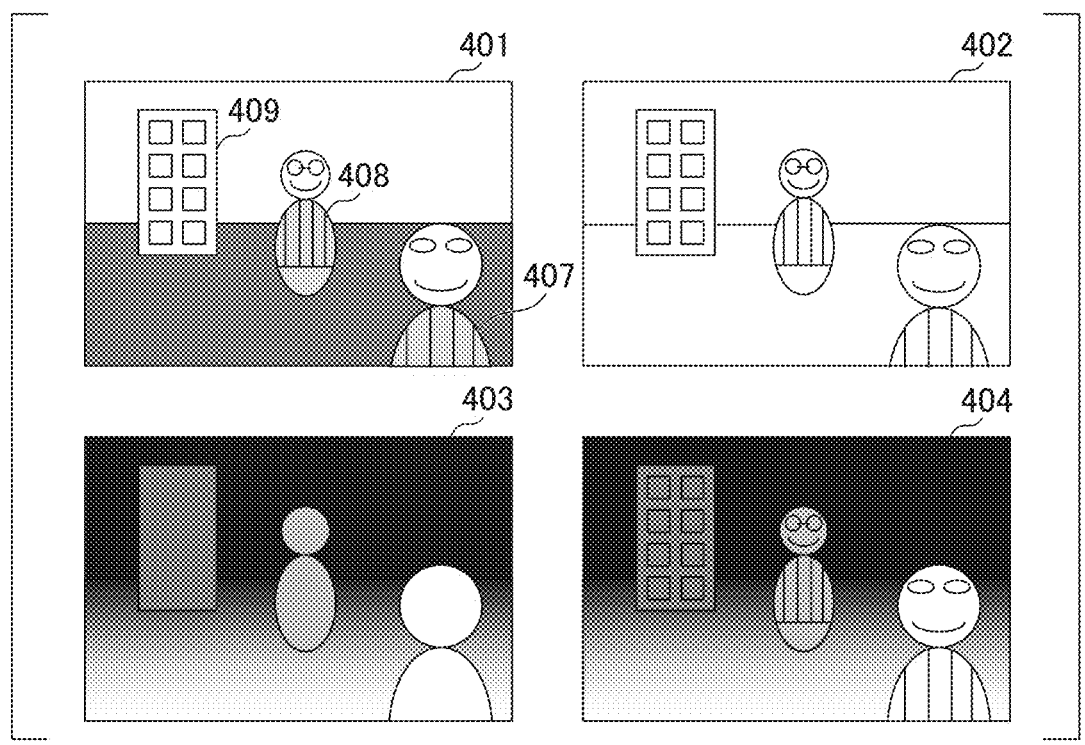
FIG. 4 is an explanatory diagram illustrating an operation of an image processing unit according to a first embodiment.

FIG. 4 is a schematic diagram illustrating a process performed by the image processing unit 107.

An image 401 is an image example corresponding to the luminance signal of the development unit 201 in FIG. 2. Of subjects 407 to 409 shown in the image 401, the subjects 407 and 408 are persons and the subject 409 is a building. The image 401 is an image captured in a state in which the subject 408 in the middle is focused, the subject 407 is located in front of the subject 408 (an imaging unit side), and the subject 409 is located behind the subject 408.

An image 402 is an image output by the lowpass inhibition filter unit 202 in FIG. 2 and corresponding to a signal of the texture component.

An image 403 is a distance map image indicating distance map data. The distance map image is an image that has distance information corresponding to each pixel position and is expressed in association with a distance distribution. In the embodiment, the image 403 is a monochromatic image in which a front side (the imaging unit side) is white and the rear side is black. That is, as a distance between an imaging device and a subject (a subject distance) becomes smaller, the image becomes whiter.

An image 404 is a combined image output by the addition unit 203 in FIG. 2 and corresponding to a signal of the texture distance map. Data of the image 403 indicating a distance map is acquired in conformity with, for example, a TOF scheme. In this case, since there is no resolution at which texture or unevenness of the surface of a subject can be expressed, the distance map image is generally flat and a signal is focused on a low-frequency band. On the other hand, since the low-frequency component of the image 402 indicating the texture component is inhibited, a vacant band of the luminance signal of the image 404 indicating the texture distance map can be efficiently used. By using the image 404, the user can check a live-view image while intuitively ascertaining the sense of distance to the subject. Further, since the color difference output signal 207 is expressed as a color difference signal of the live-view image on the display image, the user can simultaneously check the colors of the subject images.

The colors of the subject images are not necessary in some cases or a live-view image is desired to be configured with an achromatic color to improve visibility of distance information. Therefore, the image processing device according to the embodiment may be configured such that use and non-use of the live-view image of the color difference output signal 207 may be switched between manually or automatically. When the color difference output signal 207 is not used for the live-view image, the live-view image is displayed with an achromatic color.

In the embodiment, the distance information (the distance map image) is associated with only the low-frequency and of the luminance signal of the image, but the signal of the image may be used for only the color difference signal by using the distance information even in the frequency band in addition to the low-frequency band of the luminance signal. That is, a luminance signal of an image to be output may be generated using the distance map and a color difference signal of the image to be output may also be generated from a color difference signal of an image obtained from digital image data imaged and developed by the imaging unit 105 and stored in the RAM 103.

The embodiment can provide an image processing device capable of simultaneously ascertaining a color of a subject and a sense of distance to the subject. The configuration example in which the live-view image is displayed in real time on the screen of the display unit 109 has been described, but the present invention is not limited thereto. Data of a still image or a moving image with a distance map recorded on the recording medium 108 may be acquired and an image may be displayed on the screen of the display unit 109.

Second Embodiment

Next, a second embodiment of the present invention will be described.

Differences from the first embodiment will be described. The reference signs and numerals described above in the same factors as those of the first embodiment can be used and detailed description thereof will be omitted. The method of omitting the description applied to the following embodiments.

In the embodiment, a process of acquiring a plurality of pieces of viewpoint image data with different viewpoints in conformity with an imaging plane phase difference detection scheme of using a pupil division type image sensor and calculating an image deviation amount or a defocused amount will be described. The imaging unit 105 includes a pupil division image sensor and the distance map acquisition unit 110 performs an operation of detecting a phase difference using a plurality of pieces of viewpoint image data. Distance map data is acquired based on a phase difference operation result and focus adjustment control of the imaging optical system is performed.

Figure 5:
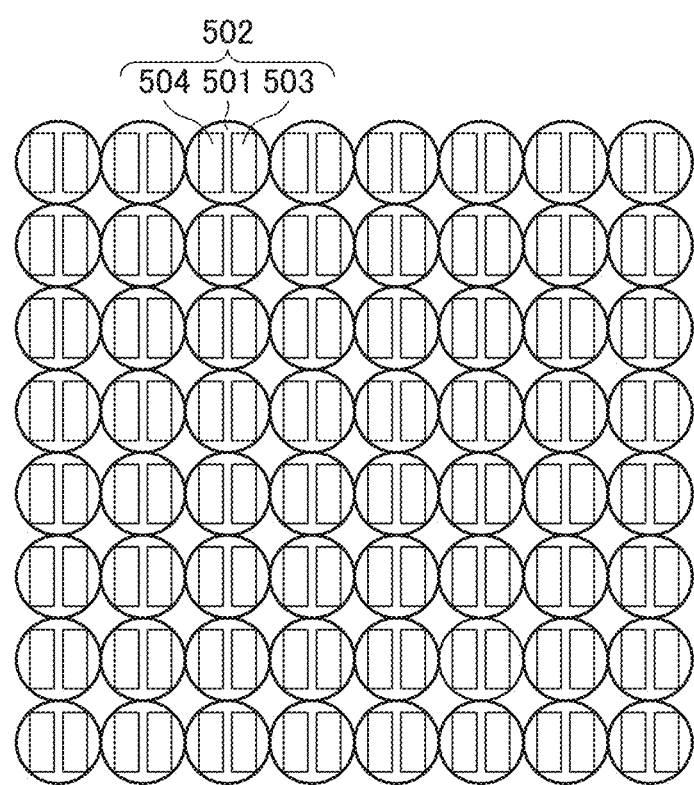
FIG. 5 is an explanatory diagram illustrating a configuration of an imaging unit according to a second embodiment.

FIG. 5 is a schematic diagram illustrating a configuration of a pixel unit of an image sensor included in the imaging unit 105. A pixel unit 502 includes a microlens 501 and a pair of photoelectric conversion unit 503 and 504 corresponding to the microlens 501. FIG. 5 illustrates many pixel units 502 that are regularly arranged in a 2-dimensional array form. Images A and B are assumed to be output as a pair of images from the pair of photoelectric conversion units 503 and 504. The first photoelectric conversion unit 503 performs photoelectric conversion on a light flux passing through a first pupil region in the imaging optical system 104 and the second photoelectric conversion unit 504 performs photoelectric conversion on a light flux passing through a second pupil region in the imaging optical system 104. In the configuration illustrated in FIG. 5, a pair of image A and B signals are acquired from the pair of light fluxes passing through the different pupil regions of the imaging optical system 104. The distance map acquisition unit 110 detects a phase difference between the image A and B signals and acquires distance map data. The distance map data can be acquired by performing correlation operation on a region of interest corresponding between a plurality of images. In the embodiment, the example in which each pixel unit includes the two separate photoelectric conversion units has been described, but more pieces of viewpoint image data can be acquired by photoelectric conversion units of which the number of divisions is 3 or more.

A series of data of the image A in a minute block of interest is notated as E(1) to E(m) and a series of data of the image B is notated as F(1) to F(m). Here, m indicates the number of pieces of data corresponding to a size of a block of interest. In this case, a correlation amount C(k) in a shift amount k between the two series of data is calculated using Expression (1) below while relatively shifting the series of data F(1) to F(m) from the series of data E(1) to E(m).

$$C(k)=\Sigma|E(n)-F(n+k)| \quad (1)$$

In Expression (1), an operation of a total sum indicated by the sign E is calculated with regard to n. In the calculation of E, ranges of n and n+k are restricted to a range of 1 to m. The shift amount k is an integer and represents a relative shift amount in units of detection pitches of a pair of pieces of data.

In an operation result of Expression (1), the correlation amount C(k) of shift amounts with high correlation of a pair of series of data is the minimum. Here, k in which C(k) is the minimum is notated as kj. A shift amount x at which a minimum value C(x) is given in continuous correlation amounts can be calculated using a 3-point interpolation method expressed in Expressions (2) to (4).

$$x=kj+D/\text{SLOP} \quad (2)$$

$$D=\{C(kj-1)-C(kj+1)\}/2 \quad (3)$$

$$\text{SLOP}=\text{MAX}\{C(kj+1)-C(kj), C(kj-1)-C(kj)\} \quad (4)$$

A defocused amount (notated as DEF) can be calculated using Expression (5) below from the shift amount x obtained in Expression (2).

$$DEF=KX\cdot PY\cdot x \quad (5)$$

Figure 6:
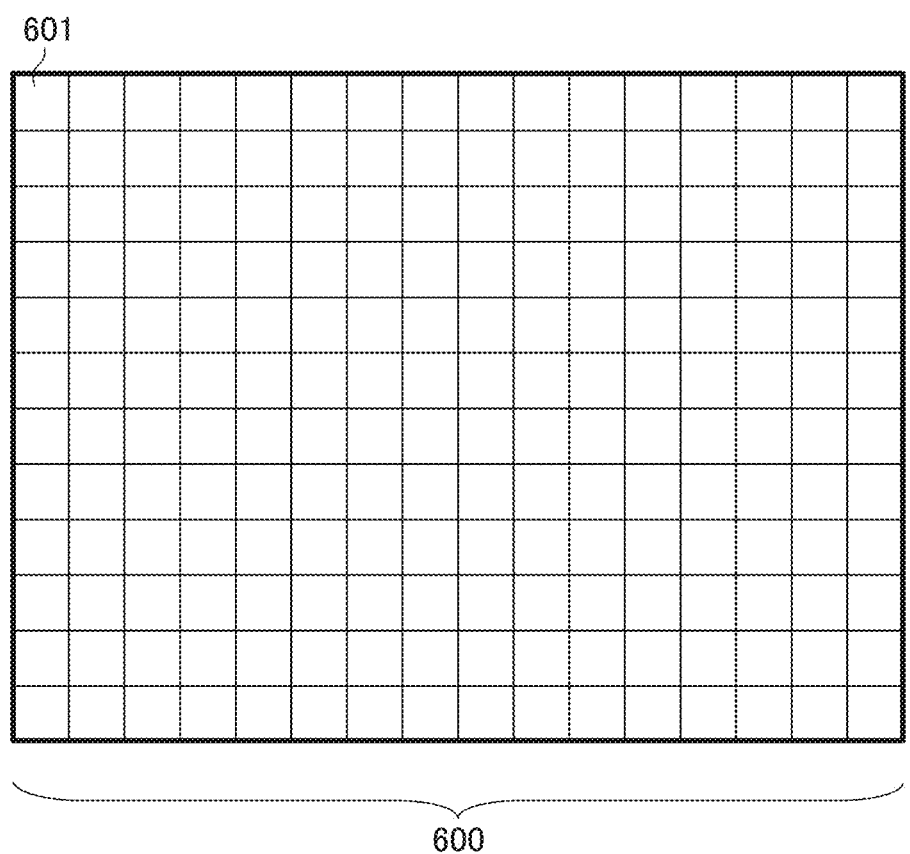
FIG. 6 is a schematic diagram illustrating a division example of a screen according to the second embodiment.

In Expression (5), PY indicates a detection pitch and KX is a conversion coefficient determined in accordance with a magnitude of an aperture angle of a center of gravity of light fluxes passing through a pair of pupils. FIG. 6 is a schematic diagram illustrating a division example of a screen 600. The screen 600 is divided into minute blocks 601 that have a size of m×m pixels and a process of calculating a defocused amount is performed on each minute block. A value of m indicating the size of one side of the minute block is, for example, 4. In the embodiment, an absolute value IDEFI of the defocused amount DEF expressed in Expression (5) is used as a distance map.

Figure 7:
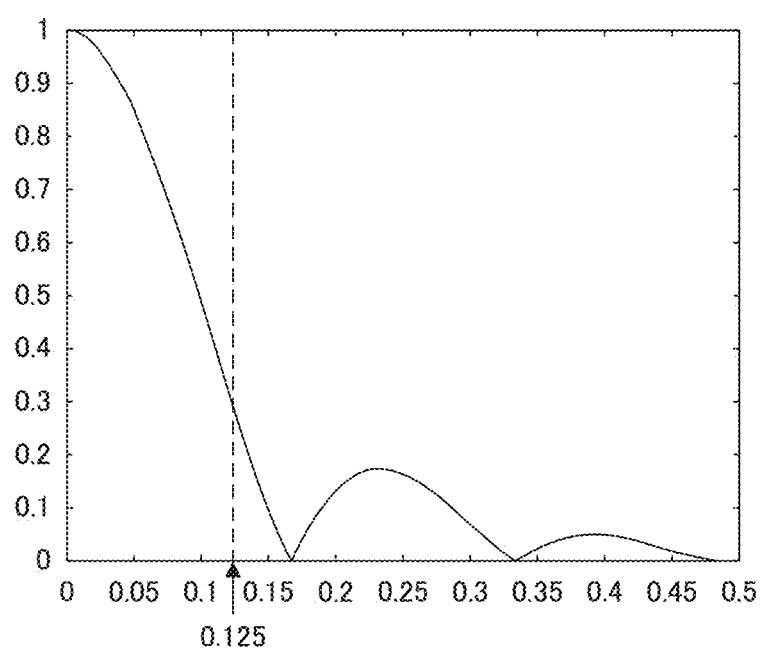
FIG. 7 is an explanatory diagram illustrating a lowpass filter characteristic of a lowpass inhibition filter unit according to the second embodiment.

The configuration of the image processing unit 107 is similar to the configuration of the first embodiment. The configuration of the lowpass inhibition filter unit 202 is illustrated in FIG. 3. In the embodiment, a filter coefficient is determined so that the cutoff frequencies of the HLPF 301 and the VLPF 302 becomes 1/m of the Nyquist frequency. In the embodiment, a frequency obtained by dividing the Nyquist frequency by m corresponding to the size of a block of interest is determined as a cutoff frequency of a lowpass filter. FIG. 7 is referred to for specific description.

FIG. 7 is an explanatory diagram illustrating a frequency characteristic of the HLPF 301 and the VLPF 302 in FIG. 3. The horizontal axis represents a spatial frequency regulated at a sampling frequency and 0.5 is a Nyquist frequency. The vertical axis represents a signal amplitude regulated at an amplitude when a frequency is zero. A filter coefficient of the HLPF 301 and the VLPF 302 is assumed to be [1222221]. In this case, a signal amplitude of a frequency that has a frequency characteristic illustrated in FIG. 7 and is equal to or greater than a target cut off frequency of 0.5/m=0.5/4=0.125 can be sufficiently attenuated.

Since units of calculations of a defocused amount in the embodiment are m×m blocks, as illustrated in FIG. 6, an occupancy band of a distance map is focused on a low-frequency band. By setting a target cutoff frequency of the lowpass inhibition filter unit 202 to 1/m of the Nyquist frequency, that is, a frequency obtained by dividing the Nyquist frequency by m, it is possible to avoid overlapping of the distance map and the occupancy band of the texture image.

Figure 8:
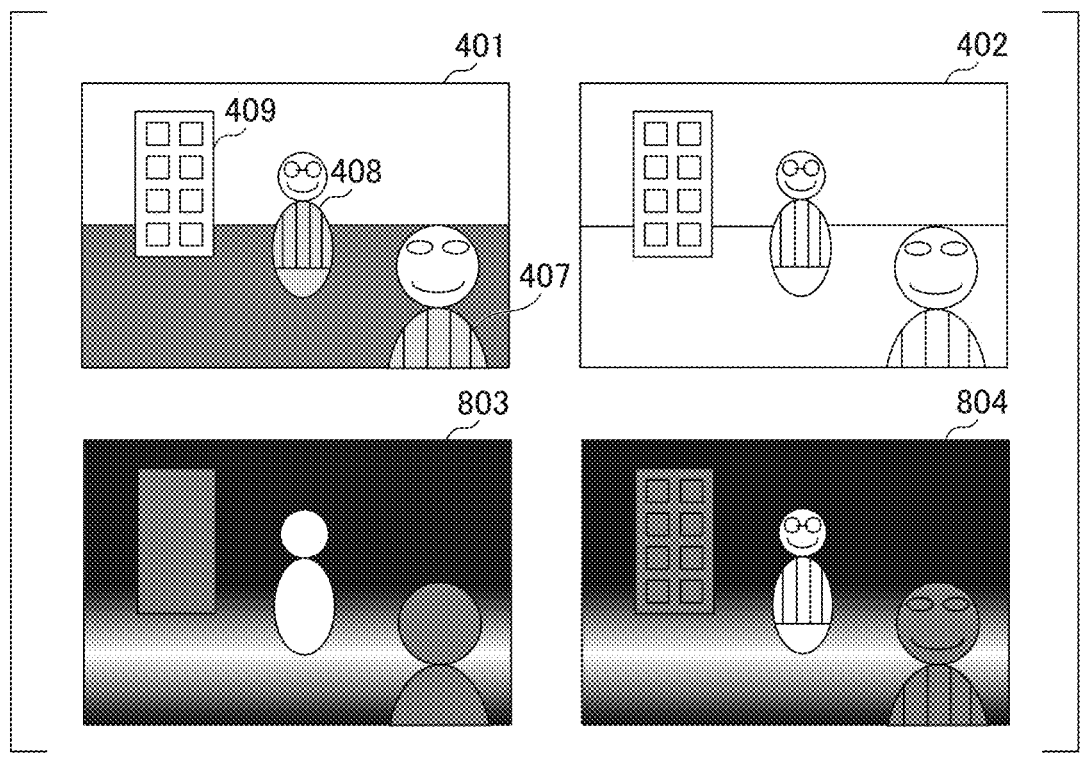
FIG. 8 is an explanatory diagram illustrating an operation of an image processing unit according to the second embodiment.

FIG. 8 is an explanatory diagram illustrating an operation of the image processing unit 107 in FIG. 1. Reference numerals 401, 402, and 407 to 409 are the same as the reference numerals in FIG. 4 described in the first embodiment. An image 803 representing a distance map is expressed in white when the defocused amount is zero, and is expressed to be darker as the defocused amount increases. For example, in a captured image, a map value corresponding to a focused region is assumed to be a first value and a map value corresponding to a non-focused region which is out of focus is assumed to be a second value. At this time, the first value is greater than the second value. The map value monotonically decreases with separation of a front side (an imaging unit side) or a rear side of a subject by using a distance corresponding to a focused region in which a predetermined subject (a main subject) is in focus in a captured image as a standard. That is, the distance map data is data of a depth grayscale in accordance with depth information. When a subject position in focus is used as a standard, a map value at the subject position is the maximum, becomes smaller as the position becomes closer to the imaging unit, and becomes smaller as the position becomes further away from the imaging unit. In a combined image 804 indicating a texture distance map in the embodiment is, a region of which a defocused amount is zero is white and luminance is emphasized and displayed. Accordingly, it is possible to improve visibility of focus at the time of focusing. When data of a still image or a moving image with a distance map in a state in which recording on the recoding medium 108 is completed is read and displayed on the screen of the display unit 109, the user can conveniently perform re-imaging after checking focus of a recording image.

According to the embodiment, the image sensor capable of detecting an imaging plane phase difference is used, the distance map acquisition unit 110 can perform an operation of detecting a phase difference to acquire a defocus map and display an image expressing a distance distribution. Thus, the user can easily ascertain a focus detection state.

Modification Examples of Second Embodiment

The present invention is not limited to the example in which the distance map data is acquired by detecting the phase difference based on the plurality of pieces of viewpoint image data. In the modification example, an example in which distance map data is acquired in conformity with a depth from defocus (DFD) scheme will be described.

Bracket imaging is performed to acquire information regarding a subject distance between an imaging unit and a subject in conformity with the DFD scheme. For example, in focus bracket imaging, continuous imaging is performed while changing a focus position of an imaging optical system at a predetermined angle of field. In this case, the distance map acquisition unit 110 performs a correlation operation between a plurality of images captured at different focus positions to acquire distance map data based on a calculation result. In aperture bracket imaging, continuous imaging is performed while changing a diaphragm value of an imaging optical system. In this case, the distance map acquisition unit 110 performs a correlation operation between a plurality of images with different diaphragm values to acquire distance map data based on a calculation result. Since each imaging method is known, detailed description thereof will be omitted.

Third Embodiment

Figure 9:
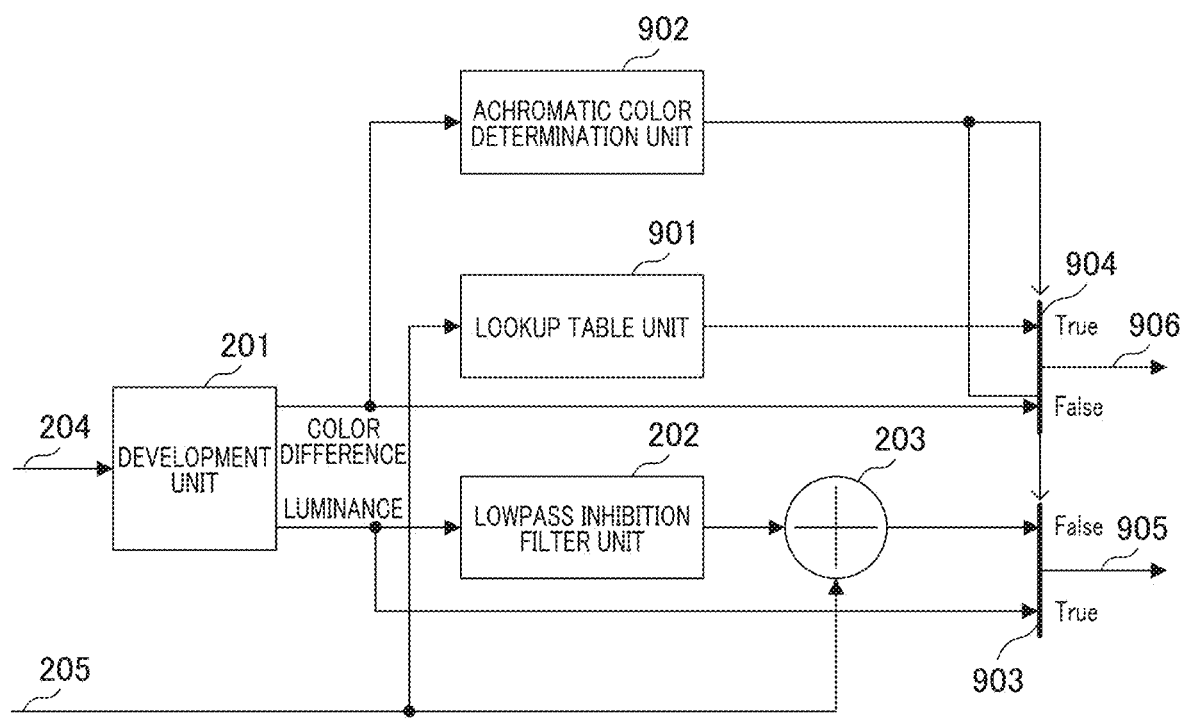
FIG. 9 is a block diagram illustrating a functional configuration of an image processing unit according to a third embodiment.

Next, a third embodiment of the present invention will be described. FIG. 9 is a block diagram illustrating a configuration of the image processing unit 107 according to the embodiment. In the embodiment, a lookup table unit 901, an achromatic color determination unit 902, a first selection unit 903, and a second selection unit 904 are added to the configuration illustrated in FIG. 2.

The lookup table unit 901 generates data of a colored distance map by converting a distance value indicated by the distance map data into a color value with reference to data stored in advance in a memory. The lookup table unit 901 acquires the output signal 205 of the distance map acquisition unit 110 and outputs a color difference signal corresponding to the distance vale of the distance map data to the second selection unit 904.

The achromatic color determination unit 902 acquires a color difference signal from the development unit 201 and determines whether each screen is an achromatic scene using Expressions (6) and (7) below.

$$SAT = \sqrt{\{(U/128)\hat{}2 \pm (V/128)\hat{}2\}} \quad (6)$$

$$SUM = \Sigma SAT \quad (7)$$

U and V in Expression (6) denote color difference signals and are assumed to have signed 8 bits (−128 to 127). Σ Integration of Expression (7) denotes integration of values of SAT on an entire screen. When a value of SUM is less than a predetermined threshold, the achromatic color determination unit 902 determines that a scene is an achromatic scene and outputs a signal of a logic value True. When a value of SUM is equal to or greater than a predetermined threshold, the achromatic color determination unit 902 determines that a scene is a chromatic scene and outputs a signal of a logic value False. A determination signal of the achromatic color determination unit 902 is input to each of the first selection unit 903 and the second selection unit 904.

A luminance signal output by the development unit 201 and a signal output by the addition unit 203 are input to the first selection unit 903. Based on a determination signal of the achromatic color determination unit 902, the first selection unit 903 selects the luminance signal output by the development unit 201 in the case of the logic value True. Based on a determination signal of the achromatic color determination unit 902, the first selection unit 903 selects the output of the addition unit 203 in the case of the logic value False and outputs the data of the texture distance map.

Based on a determination signal of the achromatic color determination unit 902, the second selection unit 904 selects an output of the lookup table unit 901 in the case in the logic value True and outputs the color difference signal corresponding to the distance map colored through color conversion. Based on a determination signal of the achromatic color determination unit 902, the second selection unit 904 selects the color difference signal output by the development unit 201 in the case of the logic value False.

A luminance signal 905 output by the first selection unit 903 and a color difference signal 906 output by the second selection unit 904 are transmitted to the display unit 109 of FIG. 1 and a live-view image is displayed in real time.

When the output of the achromatic color determination unit 902 is a signal of the logic value False and is a scene of chromatic color (a first display mode), a signal corresponding to a similar text distance map to that of the first embodiment is output. When the output of the achromatic color determination unit 902 is a signal of the logic value True and is a scene of achromatic color (a second display mode), a signal of a similar peaking-added image to that in Patent Literature 1 is output. In this way, when it is not necessary to express the color of the subject, color information can be used in expression of the distance information. Therefore, the user can intuitively ascertain the sense of distance to a subject.

In the embodiment, the chromatic color is determined for each screen in the above-described configuration, but the present invention is not limited thereto. For example, when the screen in a state in which the value of SUM in Expression (6) above is less than a predetermined threshold continues a predetermined times, the achromatic color determination unit 902 may output a signal of the logic value True. In this way, it is possible to inhibit deterioration of visibility cause due to frequency switching of the display mode. It is preferable to display index information corresponding to a determination result of the achromatic color determination unit 902 on the screen of the display unit 109 so that the user can understand a display mode in the display at the current time.

According to the present invention, achromatic or chromatic scene determination can be performed and an image displayed in a display mode in accordance with a determination result can be presented to a user.

The preferred embodiments of the present invention have been described, but the present invention is not limited to these embodiments and various modifications and changes can be made within the scope of the gist of the present invention. For example, an embodiment in which a distance distribution is displayed at a gray scale is also included in the technical scope of the present invention.

The present invention can provide an image processing device capable of ascertaining a sense of distance to a subject without influencing on colors in which the subject is displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device comprising:
at least one processor and memory holding a program which makes the at least one processor function as:
a first acquirer configured to acquire image data of a subject;
a second acquirer configured to acquire information regarding a distance distribution of the subject as map data;
a first generator configured to generate data of a texture image in which a low-frequency component of the image data is inhibited; and
a second generator configured to generate first data indicating a luminance and a distance distribution of the subject from the map data and the data of the texture image,
wherein a luminance or a color component of an image of the map data differs between a region focused and a region unfocused in a captured image obtained by imaging the subject,
wherein the image of the map data includes more low-frequency bands than the texture image,
wherein the second acquirer acquires the map data by performing a correlation operation on a region of interest corresponding between a plurality of images,
wherein the first generator includes a filter used for a process of inhibiting the low-frequency component and determines a cutoff frequency of the filter corresponding to a size of the region of interest, and
wherein the first generator determines the cutoff frequency by dividing a Nyquist frequency by a value corresponding to the size of the region of interest.

2. The image processing device according to claim 1, wherein the at least one processor further functions as a separator configured to separate a luminance component and a color component in the image data of the subject, and
wherein the first generator generates the data of the texture image from the luminance component separated by the separator.

3. The image processing device according to claim 2, wherein the second generator generates the first data by adding the map data to the data of the texture image and generates second data indicating a color of the subject from the image data of the subject.

4. The image processing device according to claim 3, wherein the at least one processor further functions as a display configured to display an image in accordance with the first data and the second data based on the color component separated by the separator.

5. The image processing device according to claim 4, wherein the display acquires the first data and the second data generated by the second generator from a captured image obtained by an imaging unit that images the subject and displays the image in real time.

6. The image processing device according to claim 1, wherein the at least one processor further functions as a first selector configured to select data that has a luminance component of an image of the subject when the image data acquired by the first acquirer is achromatic data, and to select the first data generated by the second generator when the image data acquired by the first acquirer is chromatic data.

7. The image processing device according to claim 6, wherein the at least one processor further functions as:
a converter configured to convert the map data acquired by the second acquirer into colored image data; and
a second selector configured to select the colored image data when the image data acquired by the first acquirer is achromatic data, and to select data of the color component of the image of the subject when the image data acquired by the first acquirer is achromatic data.

8. The image processing device according to claim 5, wherein, for luminance of an image of the map data, a value corresponding to a region focused in the captured image is greater than a value corresponding to a region unfocused in the captured image.

9. The image processing device according to claim 1, wherein the first acquirer acquires a plurality of pieces of image data with different viewpoints or a plurality of pieces of image data captured in a state in which a focus position or a diaphragm value of an imaging optical system is different.

10. An imaging device comprising:
an image sensor including a plurality of microlenses and a plurality of photoelectric conversion units corresponding to the microlenses; and
at least one processor and memory holding a program which makes the at least one processor function as:
a first acquirer configured to acquire image data of a subject;
a second acquirer configured to acquire information regarding a distance distribution of the subject as map data;
a first generator configured to generate data of a texture image in which a low-frequency component of the image data is inhibited; and
a second generator configured to generate first data indicating luminance and a distance distribution of the subject from the map data and the data of the texture image,
wherein the first acquirer acquires a plurality of pieces of image data by the image sensor,
wherein, a luminance or a color component of an image of the map data differs between a region focused and a region unfocused in a captured image obtained by imaging the subject,
wherein the image of the map data includes more low-frequency bands than the texture image,
wherein the second acquirer acquires the map data by performing a correlation operation on a region of interest corresponding between a plurality of images,
wherein the first generator includes a filter used for a process of inhibiting the low-frequency component and determines a cutoff frequency of the filter corresponding to a size of the region of interest, and
wherein the first generator determines the cutoff frequency by dividing a Nyquist frequency by a value corresponding to the size of the region of interest.

11. An image processing device comprising:
at least one processor and memory holding a program which makes the at least one processor function as:
a first acquirer configured to acquire image data of a subject;
a second acquirer configured to acquire information corresponding to a distance distribution of the subject as map data; and
a generator configured to generate first data in which the map data and a luminance component of the image data are included and a color component of the image data is set as a color component,
wherein the map data differs between a region focused and a region unfocused in a captured image obtained by imaging the subject,
wherein the map data includes more low-frequency bands than the luminance component of the image data,
wherein the second acquirer acquires the map data by performing a correlation operation on a region of interest corresponding between a plurality of images,
wherein the generator includes a filter used for a process of inhibiting a low-frequency component of the image data and determines a cutoff frequency of the filter corresponding to a size of the region of interest, and
wherein the generator determines the cutoff frequency by dividing a Nyquist frequency by a value corresponding to the size of the region of interest.

12. An image processing method performed in an image processing device that processes image data of a subject, the method comprising:
acquiring image data;
acquiring information regarding a distance distribution of the subject as map data;
generating data of a texture image in which a low-frequency component of the image data is inhibited; and
generating data indicating luminance and a distance distribution of the subject from the map data and the data of the texture image,
wherein a luminance or a color component of an image of the map data differs between a region focused and a region unfocused in a captured image obtained by imaging the subject,
wherein the image of the map data includes more low-frequency bands than the texture image,
wherein the map data is acquired by performing a correlation operation on a region of interest corresponding between a plurality of images,
wherein for a process of inhibiting the low-frequency component is performed using a filter and a cutoff frequency of the filter is determined corresponding to a size of the region of interest, and
wherein the cutoff frequency is determined by dividing a Nyquist frequency by a value corresponding to the size of the region of interest.

13. An image processing method comprising:
acquiring image data of a subject;
acquiring information corresponding to a distance distribution of the subject as map data; and
generating first data in which the map data and a luminance component of the image data are included and a color component of the image data is set as a color component,
wherein the map data differs between a region focused and a region unfocused in a captured image obtained by imaging the subject,
wherein the map data includes more low-frequency bands than the luminance component of the image data,
wherein the map data is acquired by performing a correlation operation on a region of interest corresponding between a plurality of images, wherein for a process of inhibiting a low-frequency component is performed using a filter and a cutoff frequency of the filter is determined corresponding to a size of the region of interest, and wherein the cutoff frequency is determined by dividing a Nyquist frequency by a value corresponding to the size of the region of interest.

14. A non-transitory recording medium storing a control program of an image processing device causing a computer to perform each step of a control method of the image processing device, the method comprising:

acquiring image data;

acquiring information regarding a distance distribution of a subject as map data;

generating data of a texture image in which a low-frequency component of the image data is inhibited; and generating data indicating luminance and a distance distribution of the subject from the map data and the data of the texture image, wherein a luminance or a color component of an image of the map data differs between a region focused and a region unfocused in a captured image obtained by imaging the subject, wherein the image of the map data includes more low-frequency bands than the texture image, wherein the map data is acquired by performing a correlation operation on a region of interest corresponding between a plurality of images, wherein for a process of inhibiting the low-frequency component is performed using a filter and a cutoff frequency of the filter is determined corresponding to a size of the region of interest, and wherein the cutoff frequency is determined by dividing a Nyquist frequency by a value corresponding to the size of the region of interest.

15. A non-transitory recording medium storing a control program of an image processing device causing a computer to perform each step of a control method of the image processing device, the method comprising:

acquiring image data of a subject;

acquiring information corresponding to a distance distribution of the subject as map data; and generating first data in which the map data and a luminance component of the image data are included and a color component of the image data is set as a color component, wherein the map data differs between a region focused and a region unfocused in a captured image obtained by imaging the subject, wherein the map data includes more low-frequency bands than the luminance component of the image data, wherein the map data is acquired by performing a correlation operation on a region of interest corresponding between a plurality of images, wherein for a process of inhibiting a low-frequency component is performed using a filter and a cutoff frequency of the filter is determined corresponding to a size of the region of interest, and wherein the cutoff frequency is determined by dividing a Nyquist frequency by a value corresponding to the size of the region of interest.

16. An image processing device comprising:

at least one processor and memory holding a program which makes the at least one processor function as:

a first acquirer configured to acquire image data of a subject;

a second acquirer configured to acquire information regarding a distance distribution of the subject as map data;

a first generator configured to generate data of a texture image in which a low-frequency component of the image data is inhibited; and a second generator configured to generate first data indicating luminance and a distance distribution of the subject from the map data and the data of the texture image, wherein, for luminance of an image of the map data, a value corresponding to a region focused in a captured image obtained by imaging the subject is greater than a value corresponding to a region unfocused in the captured image, wherein the second acquirer acquires the map data by performing a correlation operation on a region of interest corresponding between a plurality of images, wherein the first generator includes a filter used for a process of inhibiting the low-frequency component and determines a cutoff frequency of the filter corresponding to a size of the region of interest, and wherein the first generator determines the cutoff frequency by dividing a Nyquist frequency by a value corresponding to the size of the region of interest.

17. An image processing device comprising:

at least one processor and memory holding a program which makes the at least one processor function as:

a first acquirer configured to acquire image data of a subject;

a second acquirer configured to acquire information corresponding to a distance distribution of the subject as map data; and a generator configured to generate first data in which the map data is included in a luminance component and a color component of the image data is set as a color component, wherein, a luminance of an image of the map data differs between a region focused and a region unfocused in a captured image obtained by imaging the subject, wherein, for luminance of an image of the map data, a value corresponding to a region focused in a captured image obtained by imaging the subject is greater than a value corresponding to a region unfocused in the captured image, wherein the second acquirer acquires the map data by performing a correlation operation on a region of interest corresponding between a plurality of images, wherein the generator includes a filter used for a process of inhibiting a low-frequency component of the image data and determines a cutoff frequency of the filter corresponding to a size of the region of interest, and wherein the generator determines the cutoff frequency by dividing a Nyquist frequency by a value corresponding to the size of the region of interest.

* * * * *